United States Patent
Dubost

(10) Patent No.: US 10,073,868 B1
(45) Date of Patent: Sep. 11, 2018

(54) ADDING AND MAINTAINING INDIVIDUAL USER COMMENTS TO A ROW IN A DATABASE TABLE

(71) Applicant: CA, Inc., Islandia, NY (US)

(72) Inventor: Philippe Dubost, Prague (CZ)

(73) Assignee: CA, Inc., New York, NY (US)

(*) Notice: Subject to any disclaimer, the term of this patent is extended or adjusted under 35 U.S.C. 154(b) by 421 days.

(21) Appl. No.: 14/097,069

(22) Filed: Dec. 4, 2013

(51) Int. Cl.
*G06F 17/30* (2006.01)

(52) U.S. Cl.
CPC ............... *G06F 17/30292* (2013.01)

(58) Field of Classification Search
CPC ......... G06F 17/30038; G06F 17/30091; G06F 17/30525; G06F 17/30292
See application file for complete search history.

(56) References Cited

U.S. PATENT DOCUMENTS

| | | | |
|---|---|---|---|
| 6,581,060 B1* | 6/2003 | Choy ............... | G06F 17/30595 707/694 |
| 2005/0131966 A1* | 6/2005 | Lou ................... | G06F 17/30348 |
| 2008/0147841 A1* | 6/2008 | Nishino ............ | H04L 67/02 709/223 |
| 2009/0164267 A1* | 6/2009 | Banatwala ....... | G06F 17/30997 707/736 |
| 2014/0109424 A1* | 4/2014 | Leff .................. | G01B 1/00 33/701 |

OTHER PUBLICATIONS

Bhagwat, D., et al., "An annotation management system for relational databases." The VLDB Journal. Online publication Oct. 25, 2005. Springer-Verlag, Berlin, Germany.

* cited by examiner

*Primary Examiner* — Amanda L Willis

(57) ABSTRACT

A pair of system tables are created in a system tablespace of a database and store free-form data that is defined by, and provided by, an end user. The information in a first system table determines whether a user table in a user tablespace of the database is capable of being annotated with the free-form data. The second system table stores the free-form data that is used to annotate that user table. So maintained, third parties can access the free-form data for analysis.

18 Claims, 7 Drawing Sheets

30

| TABLE_ID | isPCOR |
|---|---|
| 0022 | Y |
| 0033 | N |
| 0001 | Y |
| 0737 | Y |
| 5236 | N |

| USER_ID | TABLE_ID | ROW_ID | PCOR |
|---|---|---|---|
| USER01 | 0737 | 00004 | NICE STUFF! |
| USER02 | 0737 | 00004 | 1 |
| USER03 | 0022 | 00052 | RED |
| USER01 | 0022 | 00032 | GOOD ENOUGH ... |
| USER03 | 0737 | 00125 | GREEN |
| USER02 | 0001 | 00453 | 25 |
| USER03 | 0022 | 00053 | RED |
| USER01 | 0022 | 00033 | NEED TO SPEAK TO MARK |

FIG. 4

ADDING AND MAINTAINING INDIVIDUAL USER COMMENTS TO A ROW IN A DATABASE TABLE

BACKGROUND

The present disclosure relates generally to databases, and more particularly, to systems and methods for allowing individual end users to enter free form data as user comments on data stored in user tables.

Currently, there is a push for collecting, maintaining, and analyzing "big data" in the Information Technology (IT) world. As known in the art, "big data" is a term used to describe a voluminous, complex collection of data that is difficult to process using standard relational database management tools within an acceptably reasonable amount of time. The analysis of such big data can, for example, assist companies by helping them to determine what products their customers like or don't like, or to estimate or determine possible new or emerging markets and customer trends. Thus, systems and methods relating to the collection, storage, and analysis of such "big data" are of great interest to private entities such as EBAY, AMAZON, WALMART, and various financial institutions. However, public entities, such as state and federal governments, may also be interested in big data analysis.

BRIEF SUMMARY

The present disclosure provides a method and apparatus for allowing individual end users to annotate data stored in a database table in a user tablespace with "free-form" data. More particularly, in one embodiment, a database comprises a system tablespace that includes a data dictionary for the database, and a user tablespace that includes a user table associated with a user application. The computer-implemented method comprises receiving, at the database, free form data annotating a selected row of a user table. The free form data is provided by a user and comprises user-defined data. The method also comprises determining whether the user is permitted to annotate the user table with the free form data based on a free form indicator stored in a first system table of the database, and if so, storing the free form data in a second system table of the database. In accordance with the method, the free form data stored in the second system table is then linked to both the first system table and the user table.

In another embodiment, the present disclosure provides a computing device comprising a communication interface and a programmable processor. The communication interface is configured to communicate with a user application, as well as a database comprising a system tablespace and a user tablespace. The system tablespace includes a data dictionary for the database, while the user tablespace includes a user table associated with the user application. The programmable processor is configured to receive free form data annotating a selected row of a user table, and determine whether the user is permitted to annotate the user table with the free form data based on a free form indicator stored in a first system table of the database. If the user is so permitted, the programmable processor is configured to store the free form data in a second system table of the database, and link the free form data stored in the second system table to both the first system table and the user table.

Additionally, the present disclosure provides, in one embodiment, a computer program product comprising a non-transitory computer-readable medium configured to store a database comprising control logic. The control logic, when executed by a computing device, configures a programmable controller associated with the computing device to receive free form data annotating a selected row of a user table, and determine whether the user is permitted to annotate the user table with the free form data based on a free form indicator stored in a first system table of the database. If the user is permitted, the programmable processor is configured to store the free form data in a second system table of the database, and link the free form data stored in the second system table to both the first system table and the user table.

Of course, those skilled in the art will appreciate that the present embodiments are not limited to the above contexts or examples, and will recognize additional features and advantages upon reading the following detailed description and upon viewing the accompanying drawings.

BRIEF DESCRIPTION OF THE DRAWINGS

Aspects of the present disclosure are illustrated by way of example and are not limited by the accompanying figures with like references indicating like elements.

FIG. 3 illustrates a schema for a system table used to indicate whether a user table is capable of being annotated with free form data entered by a user according to one embodiment of the present disclosure.

FIG. 4 illustrates a schema for a system table used to store the free form data that is entered by a user to annotate a user table according to one embodiment of the present disclosure.

DETAILED DESCRIPTION

Figure 1:
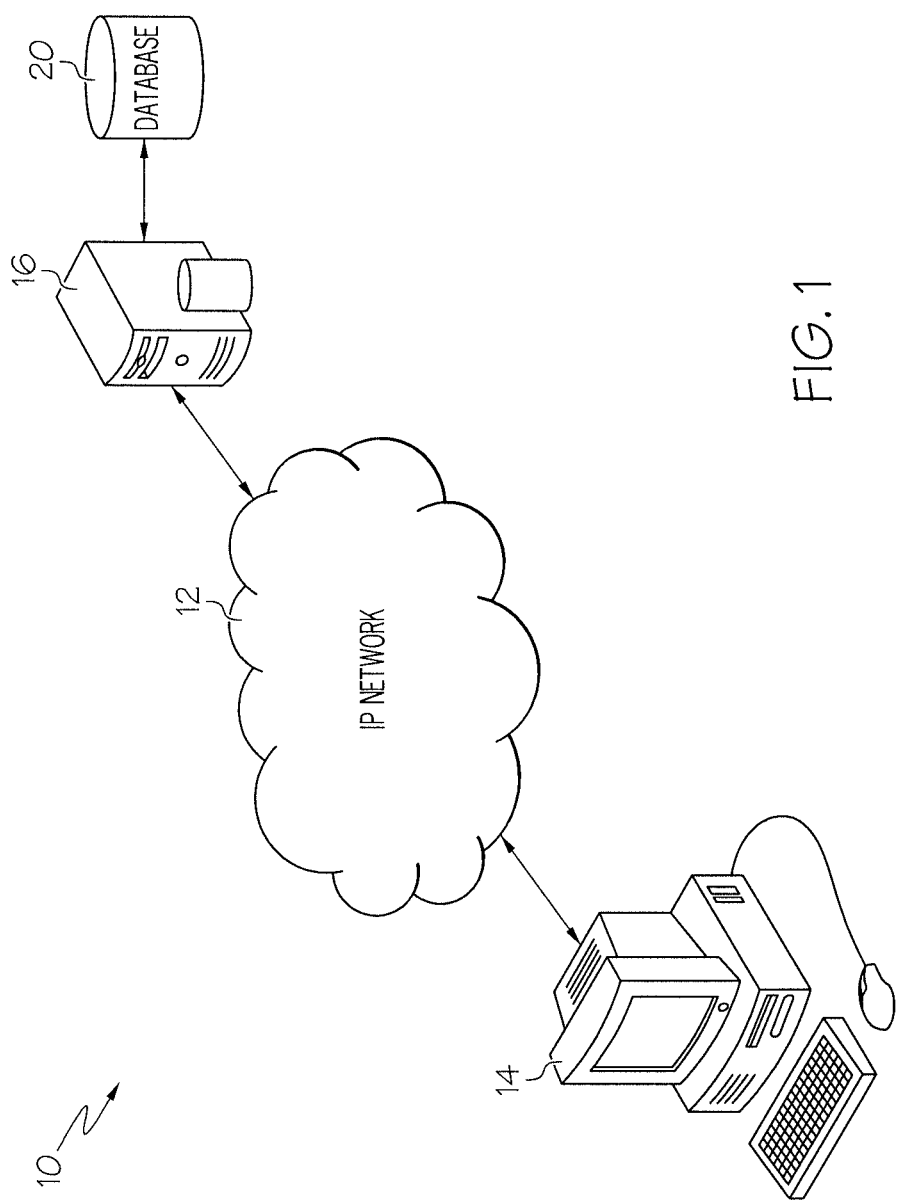
FIG. 1 is a block diagram illustrating a communication network configured according to one embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Accordingly, the present disclosure provides a network server and corresponding computer-implemented method for allowing individual users to annotate the data stored in a database table with "free-form" data. As described herein, "free-form" data is not a predefined set of data or menu choices from which a user can choose, but rather, comprises any freely flowing, arbitrary, or spontaneous information defined by the user that may or may not comply with a pre-defined format. Some examples of such "free-form" data include, but are not limited to, text comments, symbols, tags, or any combination thereof, that is entered by a user.

Allowing individual users to annotate a database table using their own user-defined free-form data as custom comments frees users from the constraints of having to use only the predefined data that is provided by an application to comment on the database table. In fact, in many cases, there is no existing mechanism for allowing users to comment on a database table, even with predefined data. Further, according to the present disclosure, the user-defined annotations are placed on the database table on a per-row basis, thereby allowing a user to manipulate the database table in a manner that is more personally suitable.

For example, consider a web site, such as AMAZON.COM, in which a user is able to rank books in order of price from highest to lowest. The end user's ability to rank these items is normally constricted by whatever menu choices are provided to the user by the application. With the present disclosure, however, the user is not constrained to a set of predefined choices, but rather, can spontaneously enter any type of data or information that the user deems suitable. For example, a user may rank the set of books displayed by the AMAZON.COM website using colors. Thus, in corresponding text entry fields next to the books being displayed, the user may enter the term "RED" to indicate the books in which the user has no interest in reading, "YELLOW" to indicate the books in which the user is at least mildly interested in reading, and "GREEN" to indicate the books in which the user is very interested in reading. The website need not provide or define these color choices, nor must the website provide or define a ranking scheme for the user to employ. Rather, the user would provide and define these color choices and/or ranking scheme. So customized, the user can then manipulate the list of books in a manner that is most meaningful to the user. For example, the user may sort the list of books based on the color entered by the user to help determine which book(s) to purchase next.

In addition to the benefits provided to the user, the present disclosure also benefits third parties. Particularly, according to one or more embodiments, the free-form data entered by a user is maintained in a centralized location. This location is not necessarily accessible to the users, or to the user level applications employed by the users; however, it is easily accessed by the owner or operator of the website (e.g., AMAZON), or if permitted by an associated security policy, various third party entities pursuant to an agreement with the owner or operator of the website. By way of example, a third party vendor accessing the AMAZON database, or even AMAZON itself, can collect and analyze the user's free-form comments. Based on the analysis of those comments, the third party, or AMAZON, can alter its marketing approach to that particular user in an effort to entice them to purchase a book that the user marked "GREEN."

Turning now to the drawings, FIG. 1 is a block diagram illustrating a communications network 10 that may be utilized according to one embodiment of the present disclosure. As seen in FIG. 1, an IP network 12, such as the Internet, for example, communicatively connects a user terminal 14 with one or more network servers 16, such as an application server hosting a website. The server 16 may also be communicatively connected to a database (DB) 20 that stores data and information that may be utilized by a user application (e.g., a website) executing on server 16. In some cases, DB 20 is located on the network server 16. In other cases, however, DB 20 is located on a different network server that communicates with network server 16 via the IP network 12.

In one embodiment, a user invokes a browser application at the user terminal 14 and provides a web address, typically a Universal Resource Location (URL), to connect to a website hosted by server 16. Once connected, the browser application executing on user terminal 14 uses the Hyper-Text Transport Protocol (HTTP) to communicate with the website hosted on server 16. For example, the browser application may generate and send a request message to the website requesting information such as a list of books or other items. In reply, the website may retrieve the requested information from a user table in DB 20, and send a response message that includes the code and data needed by the browser application to display the requested information to the user.

As stated above, the user at user terminal 14 may wish to rank the items returned by server 16, or simply comment on one or more of the items. With conventional websites, users are restricted to using only the ranking scheme and data choices that are provided by the website specifically for such purposes. However, with the present disclosure, users are not so limited. Rather, end users are free to spontaneously define their own, arbitrary, customized commentary, and further, their own customized ranking scheme. To accomplish this, the present disclosure alters the architecture of the database, such as DB 20, and provides DB control logic to take advantage of the new DB architecture.

Figure 2:
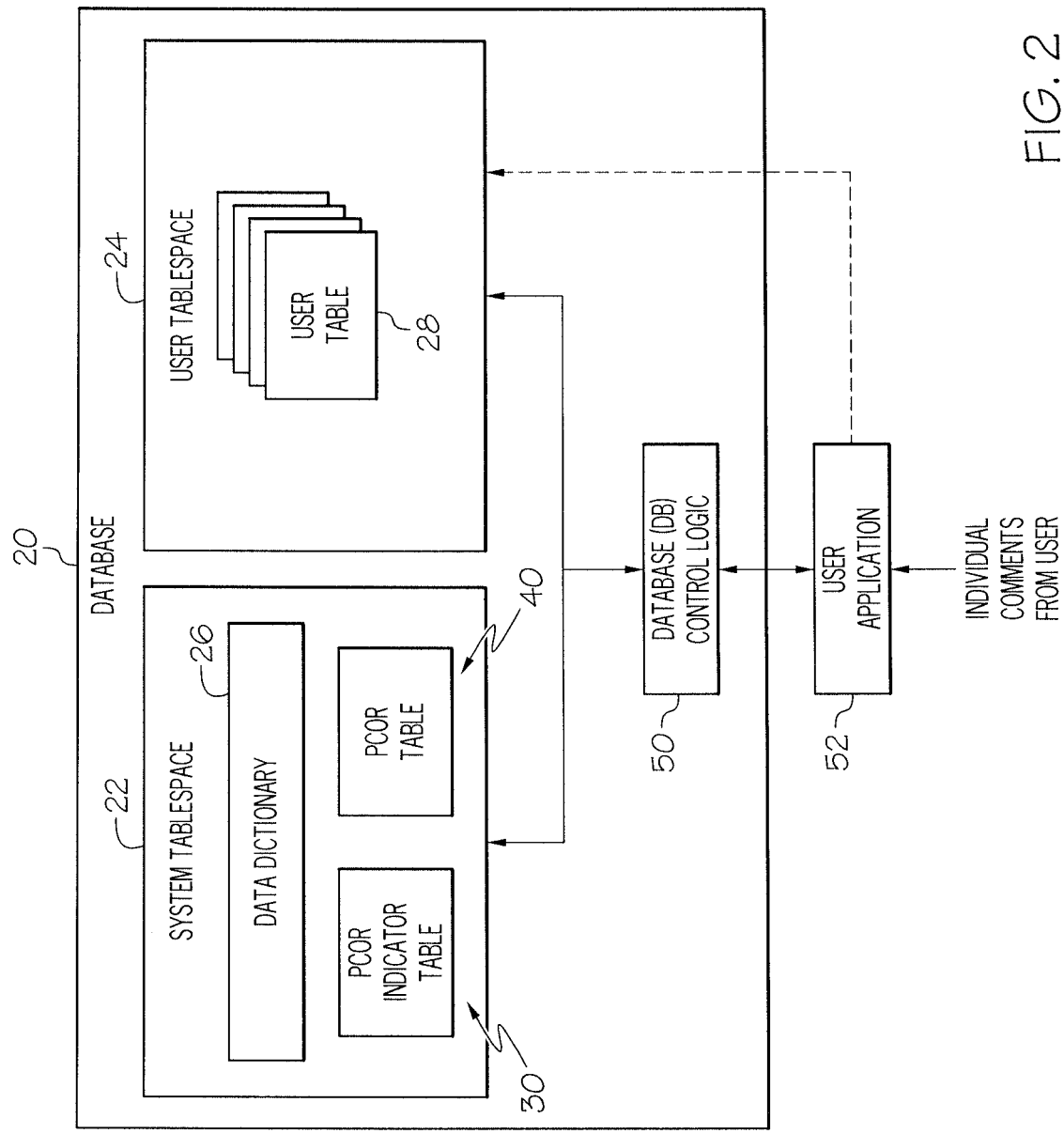
FIG. 2 is a block diagram illustrating a database architecture according to one embodiment of the present disclosure.

FIG. 2 is a block diagram that illustrates one such architecture for DB 20 according to one embodiment of the present disclosure. Particularly, DB 20 is an organized collection of data and comprises a plurality of tablespaces. As seen in FIG. 2, two of those tablespaces are a system tablespace 22 and a user tablespace 24, although there may be more tablespaces as needed or desired. As is known in the art, a tablespace is a logical storage location in which the actual underlying data files, such as database tables and indices, for example, reside. The data files within the tablespaces are the constructs that that are stored in the file system of server 16. Therefore, data files conform to the operating system (OS) in which DB 20 is running and are configured to store the data that comprises DB 20.

The system tablespace 22 is created automatically by the database software when a database such as DB 20 is initially created. The system tablespace 22 is always on-line when DB 20 is opened, and comprises general information regarding the structure and contents of DB 20. One such data file is the data dictionary 26, which contains the data dictionary tables for the entire DB 20. Normally, the data files that are associated with the system tablespace 22 are not accessible to user-level applications that interact with the end user.

The user tablespace 24 contains one or more user tables 28 that are created and maintained by user-level applications. The user tables 28, as described above, contain the user data. As is known in the art, user tables 28 may be associated with a single user-level application, or with more than one user-level application, and store the user data that is utilized by the associated user-level application. For example, for a phone or messaging application executing on server 16, the address and contact information of a user may be stored in one or more user tables 28. In another example, a website application, such as the application or applications executing on the server(s) hosting the AMAZON.COM site, for example, may store information associated with items such as books in one or more user tables 28. Regardless of the number of user tables 28 or the type of information they store, however, the information and data entered by a user may be stored in user tables 28, and later retrieved for analysis.

Conventionally, the storage and retrieval of data and information related to a given user-level application is performed by the user-level application 52. Such communications are indicated in FIG. 2 by the dotted line extending between the user application and DB 20. However, this conventional method for storing retrieving data can be cumbersome in some cases. For example, it is cumbersome for third parties that want to access and analyze certain user-provided information stored in the user-tables 28 to access and interact with the user tables 28 to extract the data needed for analysis. Specifically, the third parties may not know the structure of the user tables, and generally have no control over how the tables are updated or maintained. Additionally, the third parties are generally unaware of the type of information that is provided to the user by the user level applications for use in commenting or ranking items that are displayed. Thus, like end users, third parties are also constrained by the predefined menu choices provided by the owner or operator of the website. Further, in many cases, the third parties require the use of an application programming interface (API) to successfully connect to and access the data in the user tables 28.

The present disclosure, therefore, calls for modifying the underlying framework of DB 20. Particularly, DB 20 is modified such that in addition to creating its conventional system-level tables in the system tablespace 22, DB 20 is also configured to create and utilize two newly-defined system tables—the Personal Comment on Row (PCOR) Indicator table 30 and the POOR table 40. Further, the modifications to the framework of DB 20 include defining a new logic layer—i.e., DB control logic 50—as well as a new keyword "POOR."

As explained more fully below, the user at user terminal 14 may enter personalized comments (i.e., free-form data) in a field that is proximate an item displayed at user terminal 14 via the user-level application 52. The free-form data is then sent to DB 20 via the server 16, along with other data collected and/or generated by the user-level application 52, in a message. The DB control logic 50 intercepts the message and updates the system level tables 30, 40, as well as the user tables 28, with the information provided by the user. More particularly, the DB control logic 50 will update the user tables 28 with information collected or generated by the user-level application 52, as is conventional, but will also add the user-defined "free form" data to the POOR table 40 based on the value of an indicator stored in the PCOR Indicator table 30. So added, the user's free-form data is more accessible to various third party entities that wish to retrieve and analyze this information.

FIGS. 3 and 4 illustrate schemas for the POOR Indicator table 30 and the POOR table 40, respectively, according to one embodiment. Those of ordinary skill in the art should appreciate that other fields may be utilized in addition to, or in lieu of, the fields seen in the figures as needed or desired.

As seen in FIG. 3, the POOR Indicator table 30 comprises a TABLE_ID field 32 and an indicator field labeled "isPCOR" 64. The TABLE_ID field 32 stores a value "table-id" that identifies the ID of a particular user table 28. The table-id value appears only once in the POOR Indicator table 30 for any given user table 28. The "isPCOR" field 34, in this embodiment, stores a flag value that is set to either TRUE or FALSE (indicated here as "Y" or "N," respectively). Each table-id value in the TABLE_ID field 32 of the POOR Indicator table 30 maps to a corresponding flag value in the isPCOR field 34. A value of "Y" means that the user table 28 identified by the table-id value in the corresponding TABLE_ID field 32 is capable of being annotated by a user at terminal 14 using free form data. A value of "N" means that the user table 28 identified by the corresponding table-id value is not capable of being annotated by a user at terminal 14 using free form data. As stated previously, the PCOR indicator table 30 is created by DB 20 as a system table in the system tablespace 22 as part of the installation of DB 20, or it may be created as part of an upgrade of DB 20.

User tables 28 that will be PCOR capable (i.e., capable of being annotated with free-form data by the user) may then be created using a new key word "PCOR." By way of example, such a user table 28 may be created using an SQL command such as:
  CREATE TABLE <schema> WITH PCOR,
wherein: <schema> defines the structure of the user table 28; and
  "WITH PCOR" inserts a new row into the PCOR Indicator table 30, and populates the TABLE_ID and isPCOR fields 32, 34 with the table id value for the user table 28 and a "Y," respectively.

Legacy user tables 28 that have been created without the PCOR key word, or other non-PCOR capable user tables 28, may be updated to accept free-form data using a standard SQL UPDATE command that sets the value in the isPCOR field 34 for the user table 28 identified by table-id value to "Y." Similarly, altering a PCOR capable user table 28 to be a non-PCOR capable user table 28 may be accomplished by setting the value in the isPCOR field 34 for the user table 28 identified by table-id value to "N."

FIG. 4 illustrates a schema for the other new system table called for by the present disclosure—i.e., the PCOR table 40. As seen in FIG. 4, the PCOR table 40 comprises a USER_ID field 42, a TABLE_ID field 44, a ROW_ID field 46, and a PCOR field 48. As above, the modifications to the underlying framework of DB 20 permits the creation of the PCOR table 40 as a system table in the system tablespace 22 as part of the installation of DB 20, or as part of an upgrade for DB 20.

The USER_ID field 42 stores a "user-id" value that uniquely identifies an end user, such as the user that entered the free-form data. Such information may later be utilized by a third party to specifically target a person or group of persons for an advertisement, for example, or for tracking purposes. The TABLE_ID field 44, as described above, stores a "table-id" value that identifies a particular user table 28 on which the comment was made by the user identified by user-id. Any given value for table-id may appear multiple times in the PCOR table 40. The ROW_ID field 46 stores a "row-id" value that identifies the particular row or record of the user table 28 identified by the table-id value that was commented on by the user identified by the user-id value. Finally, the PCOR field 48 stores the actual free-form data that is entered by the user at user terminal 14 annotating the identified row in the identified user table 28.

As seen in FIG. 4, the free-form data stored in the PCOR field 48 is not comprised of any particularly accepted, well-formatted or well-bound values. Rather, the data within the PCOR field 48 comprises arbitrary comments and alphanumeric textual data spontaneously defined by a user. Moreover, different users may comment on the same or different rows of a given user table 28 using a different set of free-form data unique only to themselves, which each user's comment stored as a different row in the PCOR table 40. For example, as seen in FIG. 4, USER 01 and USER 02 have independently provided different free-form data as comments on the same row of the same user table.

As stated above, both the PCOR Indicator table 30 and the PCOR table 40 are system tables that are created and maintained in the system tablespace 22 rather than in the user tablespace 24. Maintaining these tables as system tables in the system tablespace 22, rather than as user tables in the user tablespace 24, allows the server 16 to maintain the free form information in a common area that may be easily accessible to third parties. That is, third parties need not know which user-level tables 28 store users' comments. Nor do they need to know the schema of the user tables a priori. Rather, so long as the third parties have an agreement with the owner or operator to access the data in the POOR table 40, third parties can write code to directly query the PCOR table 40 via an API or other library function published by the owner or operator of the server 16 and/or DB 20.

Figure 5:
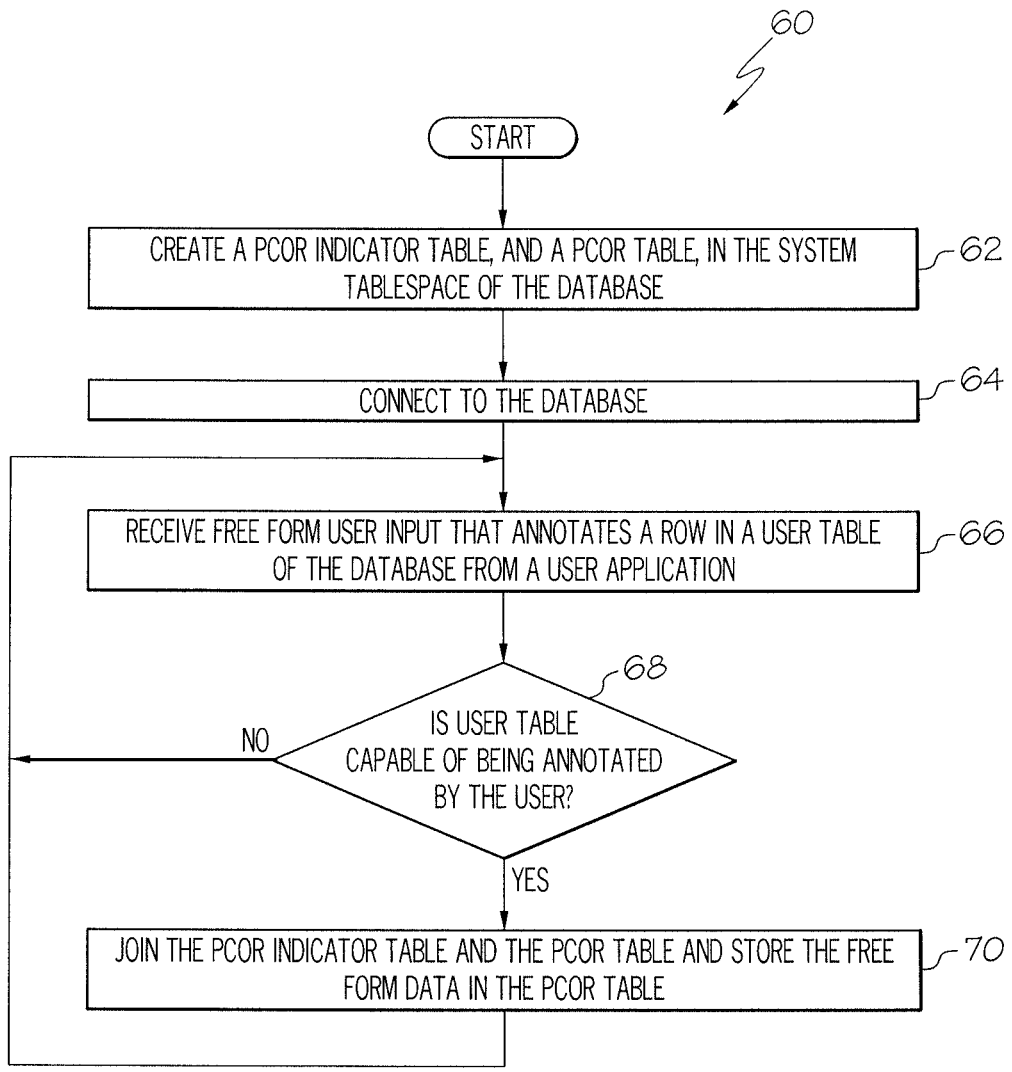
FIG. 5 is a flow diagram illustrating a method of annotating a user table using free form data entered by a user according to one embodiment of the present disclosure.

FIG. 5 is a flow chart illustrating a method 60 for how DB control logic 50 executing at server 16 annotates a selected row of a user table 28 with free-form data entered by a user.

As seen in FIG. 5, method 60 begins with the installation (or upgrade) of DB 20 onto server 16 (box 62). Although a DB Administrator or other qualified operator may perform the installation process, the modifications made to the underlying framework of DB 20 according to the present disclosure ensure that the PCOR indicator table 30 and the PCO table 40 are created as system tables in the system tablespace 22 during the installation process. In this embodiment, the schemas for the PCOR Indicator table 30 and the PCOR table 40 comprise at least the fields described in FIGS. 3 and 4; however, as previously stated, the schemas described herein are for illustrative purposes only. Once DB 20 has been installed, the user application 52 can connect to DB 20 and create one or more user tables 28 in the user tablespace 24 as "PCOR" user tables (box 64). Such connection methods are well known by those of ordinary skill in the art, and thus, are not further described here.

With the new system tables 30, 40 created, DB control logic 50 waits to receive a message that includes free-form data entered by the user. Particularly, consider an end user that desires to annotate a particular item displayed on a web page at the user terminal 14. The web page being displayed to the user would necessarily have been written (for example, in HTML code) to display a text box, or other such data entry field, near or next to the item. The provided field may or may not have a constraint with respect to the number of characters it can accept. Once the user enters the free-form data into the provided field to annotate the item, the information is sent in a message by the user application 52 (e.g., a browser application executing on terminal 14 or website application executing on server 16) to DB control logic 50. The message, in one embodiment, comprises the free-form data entered by the user, but also includes the table-id value identifying the user table 28, the row-id value identifying the row or item (e.g., a particular record in the user table 28) that was annotated by the user, and a user-id value that identifies the user making the free form annotations.

The DB control logic 50 receives the message from the user application 52 (box 66), and determines whether it needs to store any free-form data in the PCOR table 40. To accomplish this, DB control logic 50 first queries the PCOR Indicator table 30, using the table id value received in the message as an index, to locate the record for the user table 28. If the table-id value is found in the TABLE_ID field 32, DB control logic 50 determines whether the value in the corresponding isPCOR indicator field 34 is a "Y" or an "N" (box 68). If the value in the isPCOR indicator field 34 for the table-id value is an "N," or if the table-id value is not found in the POOR Indicator table 30, then DB control logic 50 determines that the user table 28 is not capable of being annotated by the user with free-form data. The DB control logic 50 can then simply discard the free-form data and wait to receive another message. If, however, the value in the isPCOR indicator field 34 for the user table 28 is a "Y" (box 68), then DB control logic 50 utilizes the table-id value received in the message in an SQL JOIN to join the POOR Indicator table 30 with the POOR table 40. The DB control logic 50 can then store the free-form data received in the message in the POOR field 48 of the POOR table 40 for the row in the user table 28 identified by the row-id and table-id values (box 70). Additionally, the control application 50 may also write the user-id value to POOR table 40. The values for the user table 28, if any, may also updated as needed or desired.

Figure 6:
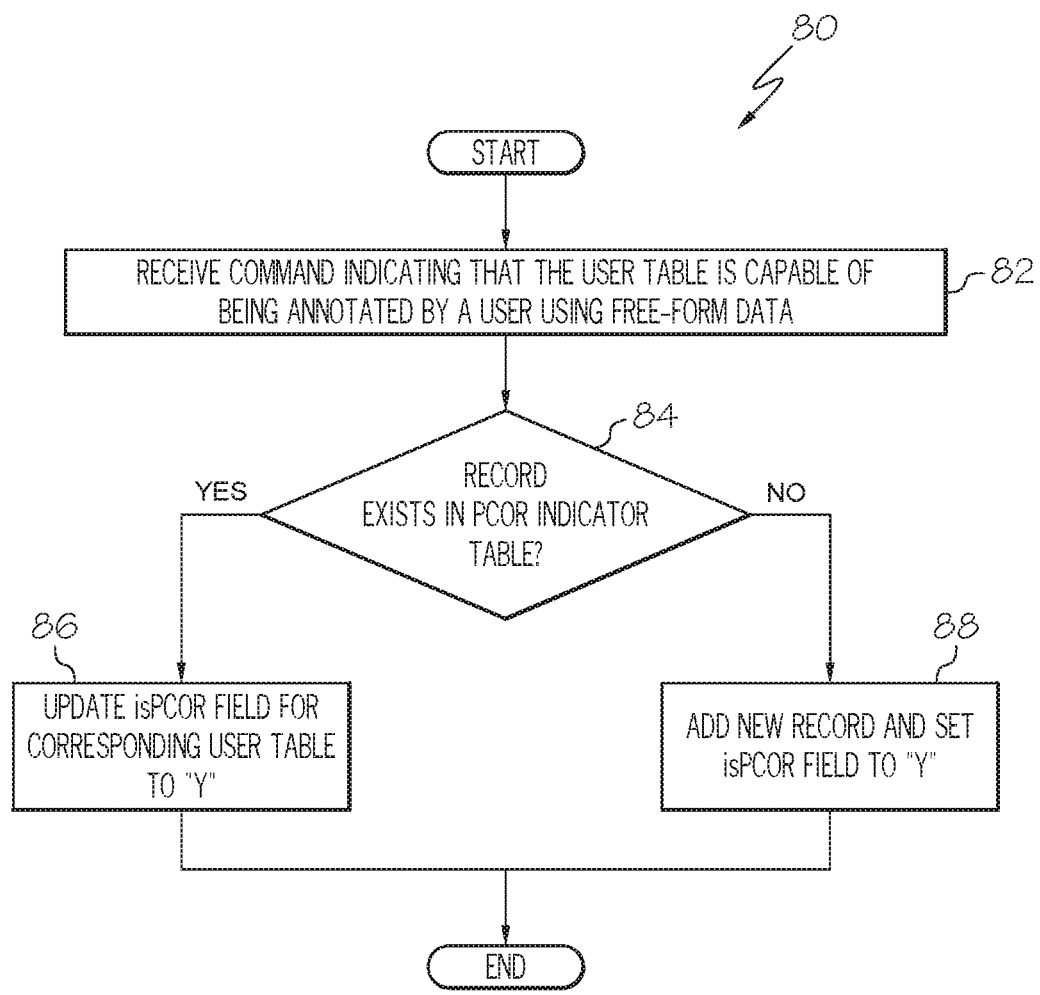
FIG. 6 is a flow diagram illustrating a method for indicating whether a user table is capable of being annotated with free form data entered by a user according to one embodiment of the present disclosure.

As previously stated, a given user table 28 must be POOR capable in order to be annotated with free-form data by the user. However, in some cases, user tables 28 that were created prior to the creation of the POOR Indicator table 30 and the POOR table 40 may not be indicated as such. Accordingly, the present disclosure also contemplates a method for updating such legacy user tables 28 to be POOR capable, which is illustrated by method 80 seen in FIG. 6.

Particularly, method 80 begins with the DB control logic 50 receiving a command indicating that a given user table 28 is capable of being annotated by an end user at user terminal 14 using free-form data (box 82). The command includes the value for the table id of the given user table 28, and may be issued, for example, by a database administrator, or by an administrator of the user application 52 that interacts with the given user table 28. The DB control logic 50 will then query the POOR Indicator table 30, using the value of table id as an index, to determine whether a record for the given user table 28 exists (box 84). If a record exists, DB control logic 50 will set the corresponding isPCOR indicator field 34 to "Y" using a standard SQL UPDATE command (box 86). If a record does not exist, however, DB control logic 50 will add a record to the PCOR Indicator table 30, and populate the TABLE_ID field 32 with the value of table id, and the isPCOR field 34 with "Y" (box 88). Thereafter, the PCOR table 40 may be updated with free-form data entered by the user as previously described.

Figure 7:
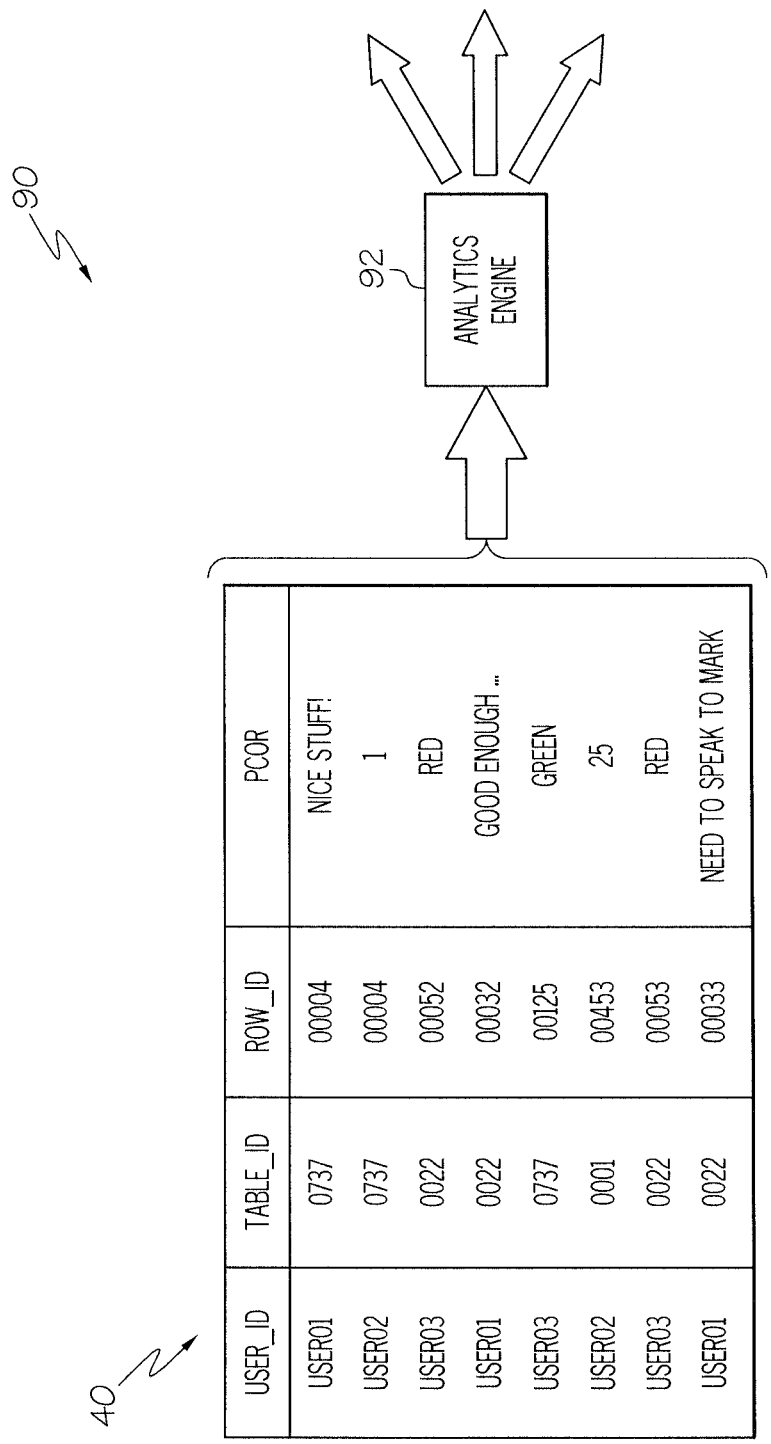
FIG. 7 is a block diagram illustrating an analytics engine for analyzing the free form data entered by a user according to one embodiment of the present disclosure.

As previously stated, collecting and storing such data provides advantages that conventional systems cannot provide. Particularly, as seen in FIG. 7, the information and data stored in the PCOR table 40 may be accessed by the owner of server 16, for example, or by an entity associated with the user application 52. In at least one embodiment, the data stored in the POOR table 40 is accessed by a third party entity. However, regardless of the entity, the data stored in the POOR table 40 may, from time to time, be input into an analytics engine 92. The data may then be analyzed, and utilized for any variety of purposes.

For example, consider a user application 52 that is designed to allow a company's salesmen to enter sales revenue data and related information into a user table 28. In such cases, the user application 52 would provide the salesmen with a variety of mandatory fields that map to a row of data in the user table 28. Some of these fields may have predetermined data choices from which the salesmen can choose a value to populate the field, while others may be data that the salesmen enter.

In some cases, the salesmen may also wish to annotate the data in these fields with free-form commentary to supplement the predetermined data choices provided by the user application 52. Additionally or alternatively, the salesmen may wish to annotate selected data fields to better describe or clarify the data that is entered in those fields. By way of example, a salesman may provide comments on a particular piece of data describing a positive or negative feeling regarding the data.

As described above, such free-form data would be stored in the PCOR table 40 by DB control logic 50 and input into an analytics engine 92. Any type of analysis may be performed on the data, but in one embodiment, the results of the analysis allow the company to better forecast quarterly sales or identify risk situations. Additionally, the results may provide an insight into what one or more salesmen think about a pricing structure based on their personal interaction with a customer. In some embodiments, using any means known in the art, the comments may be parsed to facilitate a search for certain predetermined words or phrases. Based on the number of occurrences of these words or phrases, the company may be able to determine needs for training or marketing, identify situations where customer loyalty can be improved, gain knowledge with which to restructure a department, and assess the performance and/or loyalty of one or more of the salesmen.

In other cases, a customer may be the end user providing the free-form data with respect to a web site. In such cases, an analysis can search the stored free-form data for predetermined words or phrases, and the results utilized to discover bugs or defects in the web site. Additionally, the results of such an analysis may allow a company to determine what the customers really think about a given product. Further, the company can also utilize other fields of the POOR table 40, such as the user id, to further analyze the results based on geographical, age, or gender considerations.

Figure 8:
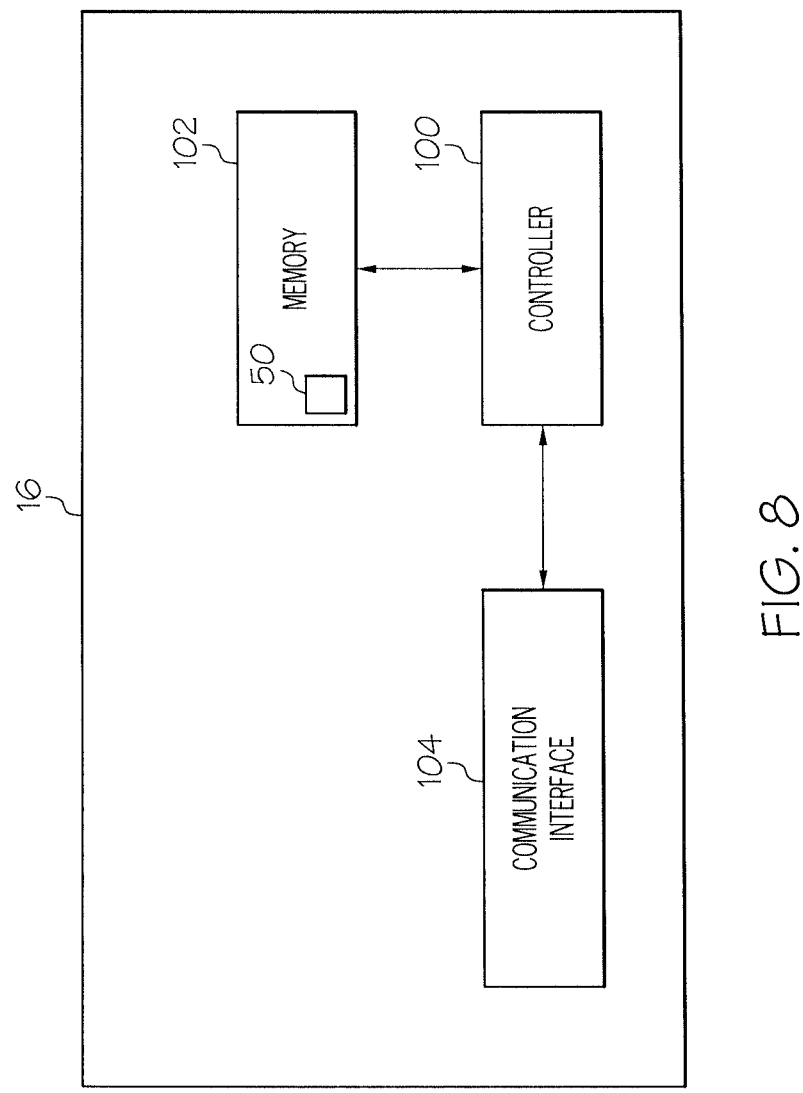
FIG. 8 is a block diagram illustrating some of the components of a network-based server configured according to one embodiment of the present disclosure.

Those skilled in the art should realize that the present disclosure is not limited to the benefits specifically men- FIG. 8 is a block diagram illustrating some of the components of a server 16 configured according to one or more aspects of the present disclosure. As seen in FIG. 8, server 16 comprises a controller circuit 100, a memory 102, and a communications interface 104. Although not specifically seen in the figure, those of ordinary skill in the art will readily appreciate that server 16 may comprise other components such as various user input/output (I/O) components that allow an operator or administrator, for example, to interact with server 16. Such components include, but are not limited to, a display monitor, a keyboard, a mouse, or other user input/output device.

The controller circuit 100 may be implemented, for example, as one or more programmable microprocessors, hardware, firmware, or a combination thereof. The controller circuit 100 generally controls the operation and functions of the server 16. Such operations and functions include, but are not limited to, executing the DB control logic 50 on server 16 to create the two system tables 30, 40, and to update those system tables 30, 40 with user-provided data, as previously described.

The memory 102 may comprise any non-transitory, solid state memory or computer readable media known in the art. Suitable examples of such media include, but are not limited to, Read Only Memory (ROM), Dynamic Random Access Memory (DRAM), Flash, or a device capable of reading computer-readable media, such as optical or magnetic media. The memory 102 stores programs and instructions, such as DB control logic 50, which when executed by the controller circuit 100, control the controller circuit 100 to perform the functions previously described.

The communications interface 104 comprises, for example, an ETHERNET interface. Communications interface 104 allows server 16 to communicate data and messages with the user terminal 14, as well as with DB 20 and other servers in network 10, using any of a variety of well-known and well-documented protocols, such as TCP/IP, for example. Other communication interfaces not specifically mentioned herein are also possible.

The present embodiments may, of course, be carried out in other ways than those specifically set forth herein without departing from essential characteristics of the disclosure. For example, it should be noted that the flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, to blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A computer-implemented method comprising:
   modifying a framework of a database during an installation process or an upgrade process of the database, wherein the database comprises a system tablespace configured to store system tables that are not accessible to user-level application programs, and a user tablespace configured to store user tables that are accessible to the user-level applications, and wherein modifying the framework comprises creating, in the system tablespace:
   a first system table configured to store a free form indicator indicating whether the user table is capable of being annotated with free form data provided by a user; and
   a second system table configured to store the free form data;
   receiving, at the database, the free form data from a user-level application via an application programming interface (API) function that accesses the second system table on behalf of the user-level application program;
   determining that the user is permitted to annotate the user table with the free form data based on the free form indicator stored in the first system table of the database;
   storing the free form data in the second system table of the database responsive to determining that the free form indicator indicates that the user is permitted to annotate the user table with the free form data, wherein storing the free form data in the second system table of the database comprises:
   joining the first system table with the second system table based on a table identifier stored in both the first and second system tables; and
   inserting the free form data into the second system table; and linking the free form data stored in the second system table to both the first system table and the user table.

2. The method of claim 1 wherein linking the free form data stored in the second system table to both the first system table and the user table comprises:
   determining a table ID identifying the user table that was annotated in both the first and second system tables;
   determining a row ID identifying which row of the user table was annotated in the second system table;
   determining a user ID identifying the user that annotated the selected row in the second system table; and
   mapping the free form data stored in the second system table to both the first system table and the user table based on the table ID, the row ID, and the user ID.

3. The method of claim 1 further comprising:
   receiving a user command from the user-level application program to update the free form data associated with the selected row of the user table; and
   triggering the database to update the free form data stored in the second system table instead of updating the user table.

4. The method of claim 1 wherein the first system table in the system tablespace is further configured to store:
   a first table ID that identifies the user table.

5. The method of claim 4 wherein the second system table in the system tablespace is further configured to store:
   a user ID identifying the user that annotated the selected row in the user table;
   the first table ID identifying the user table;
   a row ID identifying the selected row of the user table that is annotated by the user.

6. The method of claim 1 further comprising:
   responsive to determining that the user table is not capable of being annotated with the free form data:
      receiving, from the user-level application program, a user command indicating that the user table is capable of being annotated; and
      updating the first system table to indicate that the user table is capable of being annotated.

7. A computing device comprising:
   a communication interface configured to communicate with:
      a user-level application program; and
      a database comprising a system tablespace and a user tablespace, the system tablespace configured to store system tables that are not accessible to user-level application programs and comprising a data dictionary for the database, and the user tablespace configured to store user tables that are accessible to user-level application programs; and
   a programmable processing circuit configured to:
      modify a framework of the database during an installation process or an upgrade process of the database, wherein to modify the framework, the processing circuit creates, in the system tablespace:
         a first system table configured to store a free form indicator indicating whether the user table is capable of being annotated with free form data provided by a user; and
         a second system table configured to store the free form data;
      receive the free form data annotating a selected row of the user table from a user-level application via an application programming interface (API) function that accesses the second system table on behalf of the user-level application program;
      determine that the user is permitted to annotate the user table with the free form data based on the free form indicator stored in the first system table;
      store the free form data in the second system table responsive to determining that the free form indicator indicates that the user is permitted to annotate the user table with the free form data, wherein to store the free form data the programmable processing circuit:
         joins the first system table with the second system table based on a table identifier stored in both the first and second system tables; and
         inserts the free form data into the second system table; and
      link the free form data stored in the second system table to both the first system table and the user table.

8. The computing device of claim 7 wherein the programmable processing circuit is further configured to:
   determine a table ID that identifies the user table that was annotated in both the first and second system tables;
   determine a row ID that identifies which row of the user table was annotated in the second system table; and
   determine a user ID that identifies the user that annotated the selected row in the second system table; and
   map the free form data stored in the second system table to both the first system table and the user table based on the table ID, the row ID, and the user ID.

9. The computing device of claim 7 wherein the programmable processing circuit is further configured to:
   receive a user command from the user-level application program to update the free form data associated with the selected row of the user table; and
   trigger the database to update the free form data stored in the second system table instead of updating the user table.

10. The computing device of claim 7 wherein the programmable processing circuit is further configured to create the first system table comprising a structure configured to:
    store a first table ID that identifies the user table.

11. The computing device of claim 10 wherein the second system table comprises a structure configured to:
    store a user ID that identifies the user that is annotating the selected row in the user table;
    store the first table ID that identifies the user table;
    store a row ID that identifies the selected row of the user table that is being annotated by the user.

12. The computing device of claim 7 wherein responsive to determining that the user table is not capable of being annotated with the free form data, the programmable processing circuit is further configured to:
    receive a command from the user-level application program, wherein the command indicates that the user table is capable of being annotated;
    update the first system table to indicate that the user table is capable of being annotated.

13. A computer program product comprising:
    a non-transitory computer-readable medium configured to store a database comprising control logic that, when executed by a computing device, configures a programmable processing circuit associated with the computing device to:
       modify a framework of a database during an installation process or an upgrade process of the database, wherein the database comprises a system tablespace configured to store system tables that are not accessible to user-level application programs, and a user tablespace configured to store user tables that are accessible to the user-level applications, and wherein to modify the framework, the control logic causes the programmable processing circuit to create, in the system tablespace:
- a first system table configured to store a free form indicator indicating whether the user table is capable of being annotated with free form data provided by a user; and
- a second system table configured to store the free form data;

receive, at the database, the free form data from a user-level application via an application programming interface (API) function that accesses the second system table on behalf of the user-level application program;

determine that the user is permitted to annotate the user table with the free form data based on the free form indicator stored in the first system table of the database;

store the free form data in the second system table of the database responsive to determining that the free form indicator indicates that the user is permitted to annotate the user table with the free form data, wherein to store the free form data in the second system table, the control logic further configures the programmable processing circuit to:
- join the first system table with the second system table based on a table identifier stored in both the first and second system tables; and
- insert the free form data into the second system table; and
- link the free form data stored in the second system table to both the first system table and the user table.

14. The computer program product of claim 13 wherein the control logic further configures the programmable processing circuit to:
- determine a table ID that identifies the user table that was annotated in both the first and second system tables;
- determine a row ID that identifies which row of the user table was annotated in the second system table; and
- determine a user ID that identifies the user that annotated the selected row in the second system table; and
- map the free form data stored in the second system table to both the first system table and the user table based on the table ID, the row ID, and the user ID.

15. The computer program product of claim 13 wherein the control logic further configures the programmable processing circuit to:
- receive a user command from the user-level application program to update the free form data associated with the selected row of the user table; and
- trigger the database to update the free form data stored in the second system table instead of updating the user table.

16. The computer program product of claim 13 wherein the control logic further configures the programmable processing circuit to create the first system table to comprise:
- a first table ID configured to identify the user table.

17. The computer program product of claim 16 wherein the control logic further configures the programmable processing circuit to create the second system table to comprise:
- a user ID configured to identify the user that is annotating the selected row in the user table;
- the first table ID configured to identify the user table;
- a row ID configured to identify the selected row of the user table that is being annotated by the user.

18. The computer program product of claim 13 wherein, responsive to determining that the user table is not capable of being annotated with the free form data, the control logic further configures the programmable processing circuit to:
- receive a user command from the user-level application program, wherein the user command indicates that the user table is capable of being annotated; and
- update the first system table to indicate that the user table is capable of being annotated.

* * * * *